May 30, 1933.  H. C. BECK  1,911,418
MOTOR OPERATED CONTROL MECHANISM
Filed Oct. 17, 1929    4 Sheets-Sheet 1
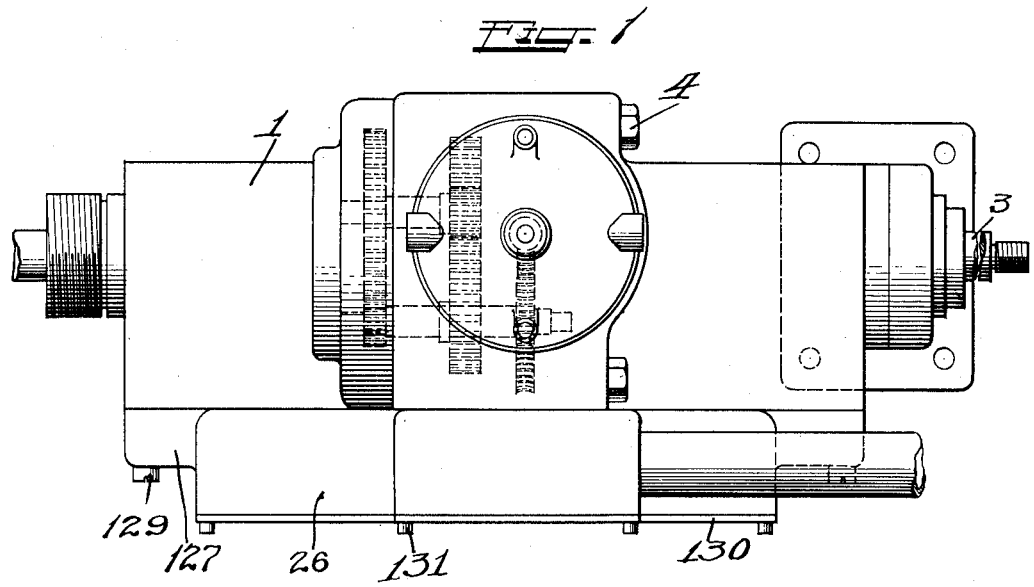
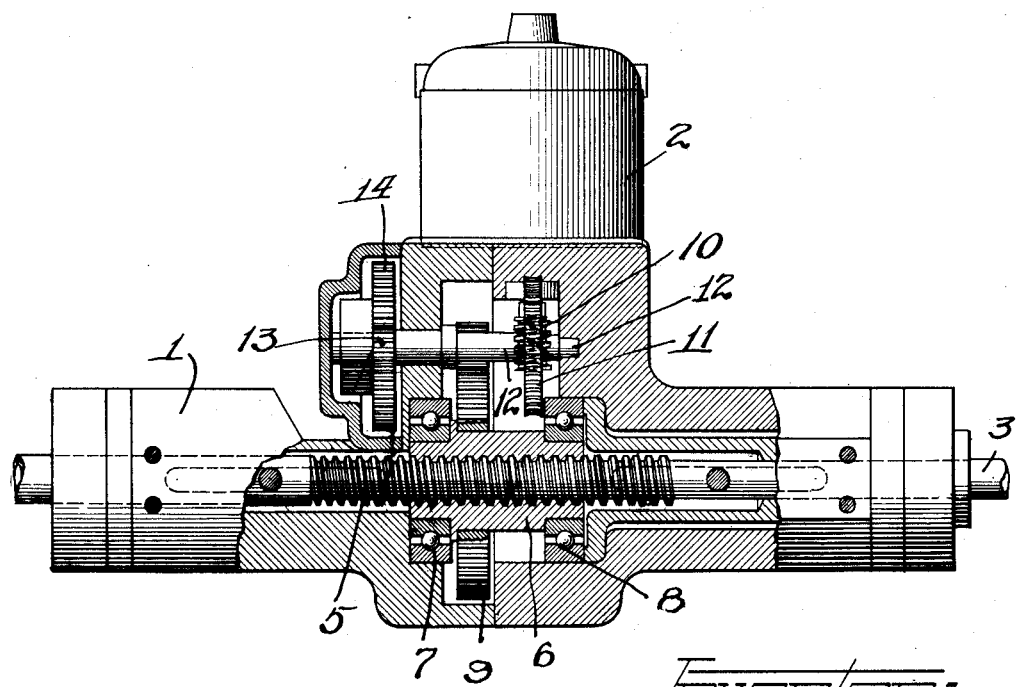
Inventor:
Harold C. Beck
by:

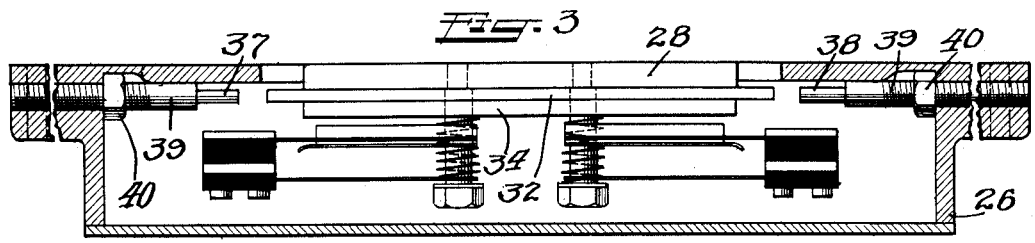
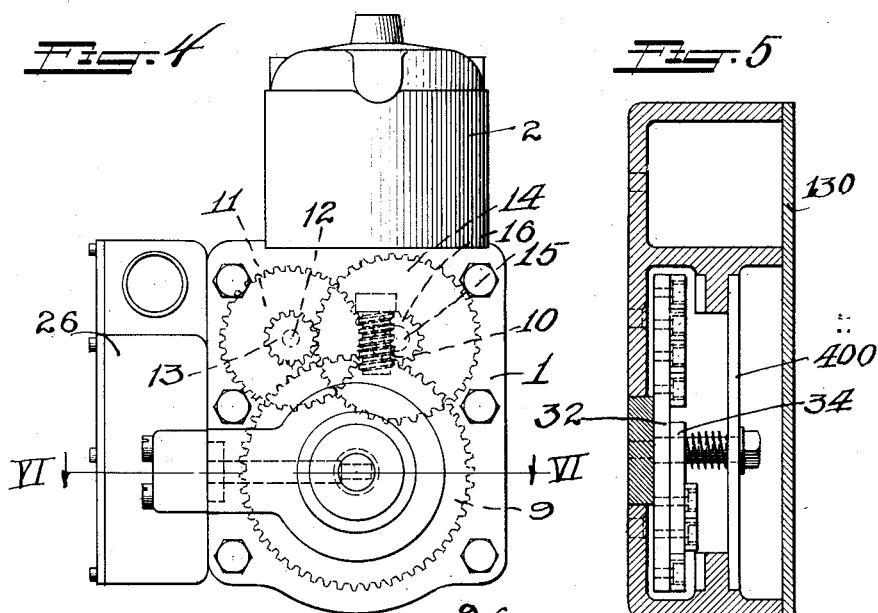
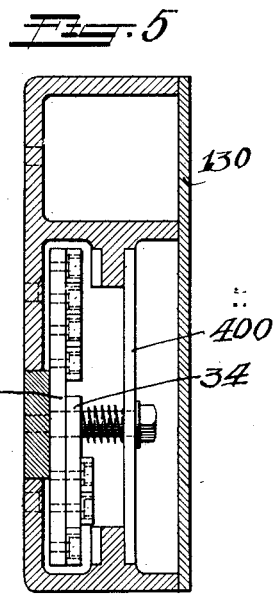
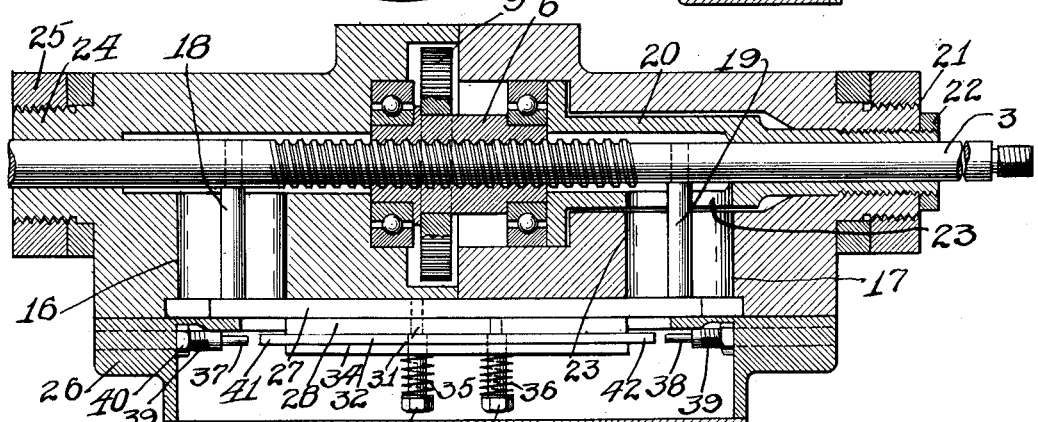

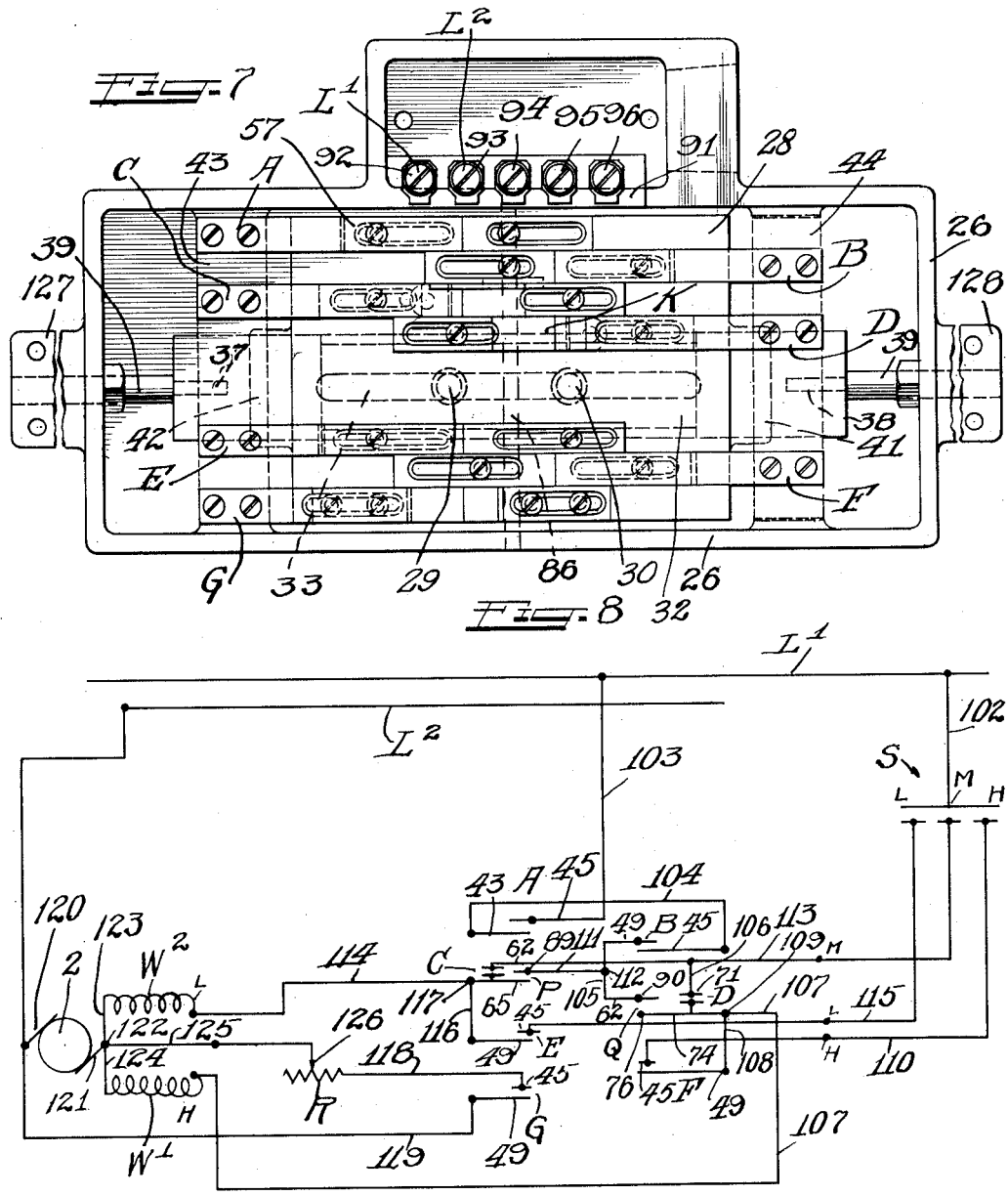

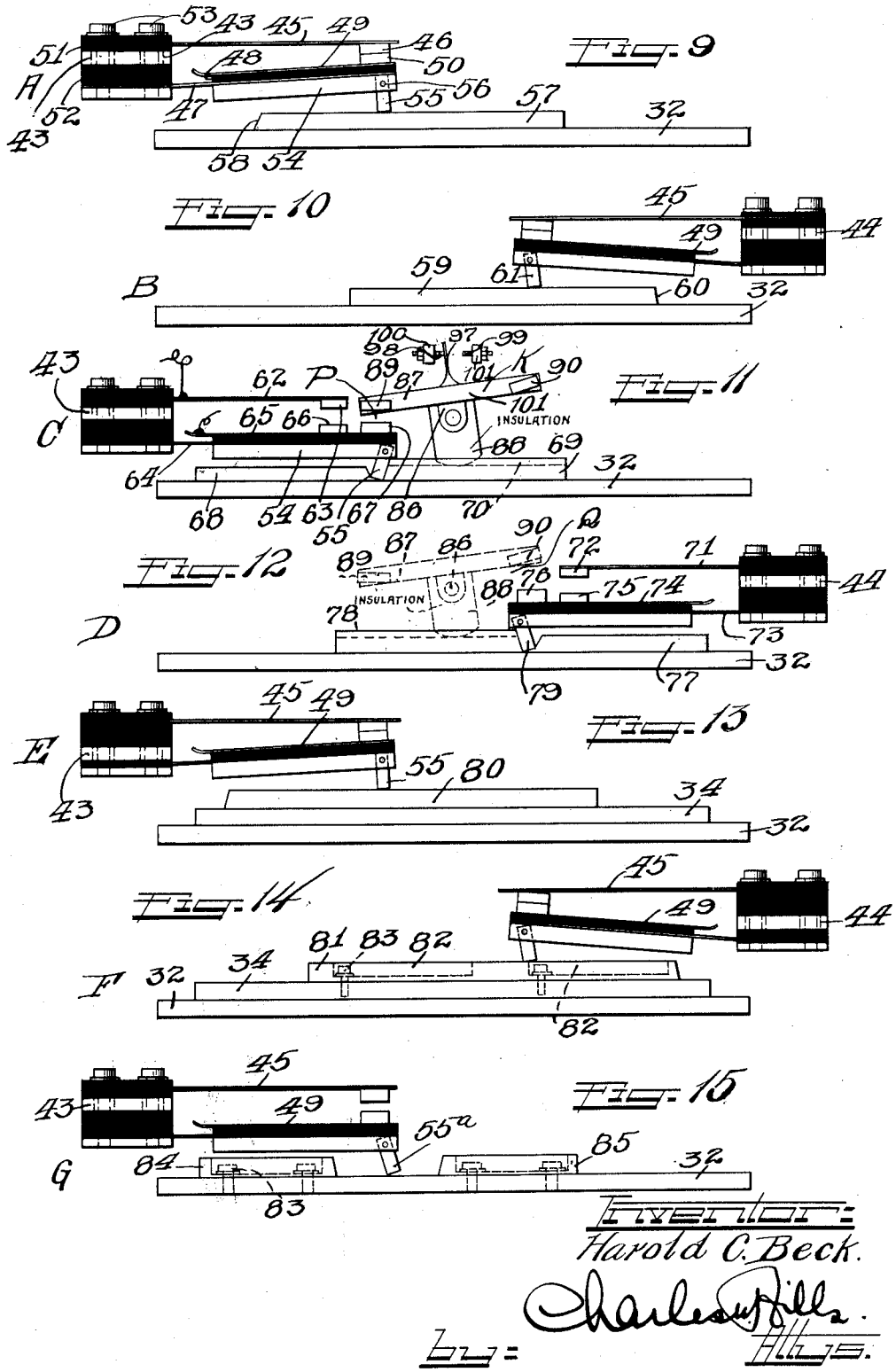

Patented May 30, 1933

1,911,418

UNITED STATES PATENT OFFICE

HAROLD C. BECK, OF EVANSTON, ILLINOIS

MOTOR OPERATED CONTROL MECHANISM

Application filed October 17, 1929. Serial No. 400,431.

This invention relates to a motor operated control mechanism and more particularly to a control mechanism or regulator for actuating speed controllers, signals, or valves and the like for regulating the flow of oil, gas, water, steam and the like, wherein the flow is made a function of the temperature or for regulating flow of other mediums wherein the flow is a function of such mediums. Such regulator finds ready use in connection with gas or oil fed burners or ovens wherein substantially constant temperature is desired and which temperature is maintained in such manner by incremental fuel supply.

The regulator of this invention may, in turn, be controlled by pyrometer, thermometer, push button or suitable like means, wherein predetermined high and low and mean points of operation of the controller actuate the device of this invention. The regulator in turn is connected to a valve or a plurality of valves, or other instrumentalities, for actuating the same to effect corresponding movement of such connected mechanism.

An object of the present invention is to provide an electrically operated regulator or motor operated control mechanism for automatically operating connected mechanism, such, for instance, as speed controllers, signal lights, valves or other devices.

Another object of the invention is to provide a motor operated control mechanism wherein a reversing motor is employed and which motor is given incremental movements by switches which are adjustable for varying the effectiveness of the motor and which motor in turn is connected to an oscillating, rotating or axially movable rod. The rod in turn is connected to any mechanism to which a motor regulator of the type of this invention may be connected.

A further object of the invention is to provide a motor operated control mechanism wherein a reversing motor is utilized in connection with a movable rod connected to any suitable mechanism to be operated thereby, wherein the motor is given incremental movements of rotation in either direction through the instrumentalities of adjustable switches which automatically are actuated by the movement of the rod, and which switches may be adjusted to vary the stroke of the rod in its effective and ineffective movements.

A still further object of the invention is to provide a motor operated control mechanism including a reversing motor geared to a movable rod, which rod in turn may be connected to mechanism to be operated, and which motor is regulated by means of switches mechanically opened and closed, which switches are arranged on relatively movable members, which members in turn are actuated by the rod in its movements under certain conditions of service.

Another and yet further object of the invention is to provide a motor operated control mechanism which is relatively simple to make, economical to manufacture, and efficient in operation.

A still further object of the invention is to provide a motor operated control mechanism wherein a single reversing motor is utilized for movement of a control rod, which rod in turn actuates the movements of members carrying switches for controlling the operation of the motor, and which switches are adjustable for varying the effectiveness of the movement of the rod by the motor.

The above, other and further objects of the invention will be apparent from the following description, accompanying drawings and appended claims.

Generally speaking the invention contemplates a reversing motor geared to a movable rod for moving said rod as said motor is energized in forward or reverse direction. The invention further contemplates suitable gearing between the motor and the rod whereby the travel of the rod may be varied.

The invention also contemplates the use of limit switches for cutting out operation of the motor under certain conditions.

The invention also contemplates the inclusion of the above named elements into a unitary structure, which structure in turn may be connected to suitable mechanism for actuating the same.

The invention furthermore contemplates the provision of mechanical means for actuating electrical holding circuits, whereby certain results are secured.

Another feature contemplated by the invention includes relatively movable cam members or plates with adjustable limits, whereby variations of the stroke of the same may be effected without affecting the length of the total possible stroke and wherein recovery of the stroke initially made may be secured promptly on reversal of the motor.

An embodiment of the invention is illustrated in the accompanying drawings and the views thereof are as follows:

The form of mechanism chosen to exemplify the present invention includes a reversing motor connected to an axially movable rod, although the invention contemplates a rotatable or oscillating rod or equivalent means as well.

Figure 1 is a top plan view of a motor operated control mechanism including the present invention.

Figure 2 is a front elevational view, with certain parts in section, showing one method of connecting the axially movable rod with the motor.

Figure 3 is an enlarged horizontal sectional view taken through the terminal or switch box forming a part of the illustrated embodiment of the invention.

Figure 4 is an end elevation of the mechanism illustrated in Figure 1.

Figure 5 is an enlarged vertical section taken through the terminal box or switch compartment.

Figure 6 is a horizontal section taken substantially on line VI—VI of Figure 4.

Figure 7 is a plan view of the terminal box or switch housing with the cover plate removed and showing certain details of construction.

Figure 8 is a wiring diagram showing connections of the various switches with the motor and other members of the mechanism.

Figure 9 is a side elevational view of the holding circuit switch and associated parts for the low side of the regulator.

Figure 10 is a side elevational view with associated parts of the holding circuit switch for the high side of the regulator, showing the switch in closed position.

Figure 11 is a side elevational view of what is termed herein as the low side holding circuit center contact switch with the switch in opened position.

Figure 12 is a side elevational view of what is termed herein as the high side holding circuit center contact switch with the switch open.

Figure 13 is a side elevational view of the low side limit switch with the same in closed position.

Figure 14 is a side elevational view of the high side limit switch with the same in closed position.

Figure 15 is a side elevational view of the slow speed switch which, under certain conditions, cuts in resistance to the motor for slackening the speed of the same.

There appear herein certain terms and words which are used herein merely for the purpose of convenience and not by way of limitation and it is to be understood that these terms are used generically without limiting the scope of the invention because of the use of the same and, therefore, the invention is to be construed accordingly.

The illustrated embodiments of the invention includes a casing 1 with which is associated a motor 2.

The casing 1 may be made as a casting with a suitable connection for the motor.

An axially movable rod 3 extends through the casing 1.

The casing is illustrated as comprising two parts which may be fastened together by means of bolts 4.

The central part of the rod 3 is threaded at 5. A nut 6 surrounds the threaded portion 5 of the rod and is restrained against axial movement by being retained by anti-friction members such as ball bearings 7 and 8 surrounding the nut. A gear wheel 9 is integral with or suitably attached to the nut 6 for rotating the same in either direction.

The motor shaft is provided on its inner end with a worm 10 which engages a worm wheel 11 on a shaft 12, suitably supported in casing 1. The shaft 12 carries a small pinion 13 which meshes with a gear 14 on shaft 15. The shaft 15 carries a small gear 16 which meshes with gear 9 on the nut 6. The gearing just described forms a train of gears between the motor 2 and nut 6 for rotating the nut in either direction as the motor is operated in either direction in a manner to be hereinafter more fully explained.

The casing 1 is provided with laterally extending spaces 16 and 17 through which extend pins 18 and 19, the inner ends of which are secured to the rod 3 and thus have bodily lateral movement as said rod is moved axially by the nut 6. The pins 18 and 19 serve to prevent rotation or oscillation of the rod by the nut.

A sleeve 20 surrounds the rod 3 at one end and is threaded on its outer end at 21 to receive a nut 22 for positioning the rod in the casing. The sleeve 20 is cut away at 23 to allow passage therethrough of the pin 19.

The casing 1 at the other end is provided with a threaded boss 24 on which may be screwed associated mechanism to be controlled by axial movement of the rod 3.

A terminal box or switch casing 26 is fastened to a side of the casing 1 and the pins 18 and 19 connected to the rod 3 extend into the terminal box 26. A plate 27 is connected to the ends of the pins 18 and 19 and therefore is movable as the rod 3 is axially moved. The inner face of the plate 27 bears against a correspondingly shaped face of the casing 1. A plate 28 is arranged next to plate 27. Bolts 29 and 30 having reduced threaded ends 31 are screwed into threaded apertures in the plate 27 and pass through the plate 28.

A plate 32 lies against plate 28 and is provided with an elongated slot 33 therein which receives the bolts 29 and 30. The plate 32 is relatively slidable with respect to the plates 27 and 28. Another plate 34 is arranged against the plate 32 and likewise has bolt holes through which pass the bolts 29 and 30. Springs 35 and 36 surround the bolts 29 and 30 and bear against the plate 34 for maintaining the plates 34 and 32 respectively against the plate 28, while allowing relative movement of plate 32 with respect to the plates 28 and 27.

A stop pin 37 is arranged in the left hand end of the switch box 26, as may be seen in Figure 6, while a similar pin 38 is arranged in the right hand end of the switch box. The pins 37 and 38 are longitudinally adjustable by means of screws 39 and locknuts 40. The screws 39 extend into and have threaded engagement with the ends of the switch box 26. The pins 37 and 38 are arranged in line with the ends of plate 32 and serve as limiting stops for said plate as the same is moved to the right and to the left as will be more fully explained.

The plate 32 is provided with end projections 41 and 42 for contacting respectively the pins 37 and 38. The plate 32 is in width substantially the height of the switch box 26 while the plate 34 is in width substantially half the height of the switch box 26.

The bolts 29 and 30 with the springs 35 and 36 thereon maintain the plates 34 and 32 in frictional engagement with each other and also in engagement with plate 28, so that as the plate 28 is moved by the rod 3 the plates 32 and 34 will be moved together and also relatively to each other as will be more fully explained.

A strap 43 extends from top to bottom of the switch box 26 near the left end thereof while a similar strap 44 extends from top to bottom thereof near the right hand end.

The strap 43 supports what are termed herein the low side switches as follows: Low side holding circuit switch A, low side holding circuit center control switch C, low side limit switch E and the slow speed switch G.

The strap 44 supports what are termed herein the high side switches, including the high side holding circuit switch B, the high side holding center control circuit switch D and the high side limit switch F.

The low side switches are shown in elevation in Figures 9, 11, 13 and 15 while the high side switches are shown in elevation in Figures 10, 12 and 14.

The low side holding circuit switch A includes a spring arm 45 carrying a contact point 46, another spring arm 47 which is provided with an insulating block 48 on its top side. There is a conductor strip 49 secured to the insulating block 48 and is provided with a contact 50 for cooperating with the contact 46 on the arm 45. The arms 45 and 47 are insulated from the strap 43 by insulating pieces 51 and 52 respectively. The arms 45 and 47 on the insulating blocks 51 and 52 are secured by means of screws 53 passing through the same and the strap 43. The arms 45 and 47 are made of spring metal so as to yield as the arm 47 is actuated by its cam mechanism.

A bar 54 is fastened to the underside of the arm 47 and carries at its outer end a pivoted follower 55 which is pivoted at 56 to the end of the bar 54 near the free end of the arm 47.

The plate 32 is provided with an adjustable cam plate 57 which is secured to the plate 52 by screws or any other suitable means, allowing relative arrangement of the plate 57 with respect to the plate 32. The cam plate 57 has at its left hand end an inclined end 58 to raise the follower 55 after the same has left the cam plate 57 as will be more fully explained.

The high side holding circuit switch B shown in Figure 10 is constructed like the low side holding circuit switch A of Figure 9, except that the switch B is supported on the strap 44 on the high side of the switch box.

A cam plate 59 is adjustably secured to the plate 32 for varying the opening and closing of the high side holding switch B in the same manner as the cam 57 of the low side holding switch A is adjusted. The right end of the cam plate 59 is inclined at 60 so that the follower 61 may ride up the incline into closing position or snap over the same into opening position.

The low side holding circuit center contact switch C includes an upper spring metal arm 62 carrying a contact point 63. The lower spring arm 64 supports a contact member 65 which in turn is provided with a contact point 66 for cooperating with the contact point 63 on the arm 62 and a second contact point 67 spaced outwardly from the contact point 66. This switch likewise is provided with a bar 54 having a follower 55 like follower 55 of switch A.

A cam plate 68 is adjustably secured to the plate 32 for actuating the follower 55 of the switch C. The cam 68 is a low cam. Another cam 69 higher than the cam 68 is also secured to the plate 32 and is adjustable on the same. The cams 68 and 69 provide a gap between the adjacent ends of the same for the follower 55 when the parts are in intermediate position as is illustrated in Figure 11. The cam plate 69 is provided with a marginal depression 70 along its upper edge, that is, its upper edge when the parts are arranged in the switch box 26 as illustrated in Figure 7.

The switch D is similar to the switch B except reversed as to position and supported on the strap 44. The switch D is provided with an upper spring arm 71 carrying a contact point 72 and has a lower spring arm 73 carrying a contact member 74 which is provided with a contact point 75 for cooperating with the contact point 72 on the arm 71 and another contact point 76 beyond the contact 75. The contact 76 is higher than the contact 75. A cam plate 77 similar to cam plate 68 of the switch B is adjustably arranged on the sliding plate 32. Another cam plate 78 of greater height than the plate 77 is also adjustably arranged on the sliding plate 32. The adjacent ends of the cam plates 77 and 78 form a gap into which the follower 79 may fall under certain conditions.

The low side limit switch E is constructed like the low side holding circuit switch A. A cam plate 80 is adjustably secured to the sliding plate 34 which cam plate cooperates with the follower 55 of the switch E for opening and closing the same as the plate 34 is moved to and fro in a manner to be hereinafter described.

The high side limit switch F is like the low side limit switch E except reversed as to position and supported on the strap 44. A cam plate 81 is secured to the sliding plate 34 for opening and closing the switch F. Figure 14 shows one manner for adjustably securing the several cam plates to the associated plates 34 and 32 and as illustrated shows the cam plate as provided with grooves 82 in which there are screws 83 engaging the sliding plate 34. The other cams may be secured to the associated plates in a similar manner.

The slow speed switch G is supported on the strap 43 and is constructed like low side holding circuit switch A. The cam follower 55a of switch G is a double swinging follower, that is, has swinging movement in both directions with respect to its pivot on arm 54. A cam plate 84 termed herein the low side low speed cam is adjustably secured to the sliding plate 32 by screws 83. Another cam plate 85 termed herein the high side slow speed switch cam is secured to the plate 32 but spaced endwise from the cam plate 84.

A rod 86 extends from top to bottom of the switch box 26 and supports a rocker arm K. The rocker arm K consists of a head 87 and a depending leg 88 of insulating material having its lower end curved for rolling contact with the depression 70 in the side margin of the cam 69 of the switch C and also on top surface of adjacent cams 59 and 57 of switches B and A respectively. A contact point 89 is carried at one end of the head 87 of the rocker K for cooperating with the contact point 67 of the switch C. Another contact point 90 is carried at the other end of the head for cooperating with the contact point 76 of the switch D.

The switch box 26 is provided with an insulating support 91 carrying a plurality of bindings posts, there being five such posts, 92, 93, 94, 95 and 96 illustrated in Figure 7.

The rocker K has an upstanding projection 97 on its top side which lies between two adjusting screws 98 and 99 which are supported in lugs 100 and 101 respectively so that the rocking movement of the rocker K may be controlled within the limits defined by the adjusted positions of the screws 98 and 99. The curved end of the leg 88 will slide on the cams mentioned after arm K has stopped its rocking movement by engagement with either of the stops or screws 98 and 99.

A pyrometer, thermometer or like instrument may be connected to the controller of this invention for actuating the same responsive to temperatures of a controlled apparatus and such pyrometer or other means is illustrated diagrammatically in Figure 8 at S where there is shown in the wiring diagram appearing in Figure 8 such instrumentality having three contact points designated respectively L, M and H. The L contact being for actuating the mechanism when the temperature falls to a low minimum, the H contact for actuating the control mechanism when the temperature reaches a high or predetermined maximum and the contact M for actuating the controller when the temperature reaches an intermediate point, all of which temperatures may be set as desired.

The wiring diagram illustrated in Figure 8 is one which may be followed in connecting the apparatus of this invention.

A motor is represented diagrammatically at 2 having a split field W1 and W2 for reversing the motor with a resistance R which may be cut in or cut out by means of the switch G in a manner to be hereinafter explained.

The wiring diagram in Figure 8 illustrates one line conductor $L^1$ and another line conductor $L^2$. The conductor $L^1$ is connected by a conductor 102 to the pyrometer or other control means S. The line $L^1$ is connected by a conductor 103 to the arm 45 of the low side holding circuit switch A. A conductor 104 connects the arm 49 of the switch A with the arm 45 of the switch B, thus putting switches A and B in series.

A conductor 105 connects the arm 49 of the switch B with rocker arm contacts 89 and 90 of the switch D. A conductor 106 connects the arm 62 of the switch C with arm 71 of the switch D for establishing contact to the contact point 72 on said arm. A conductor 107 connects arm 74 of the switch D with the field $W^1$ of the motor which is the high side field of the same.

A conductor 108 is connected to the conductor 107 at 109 and is connected to the contact member 49 of the high side limit switch F. The arm 45 of the high side limit switch F is connected by a conductor 110 to the point H of the pyrometer S.

The rocker arm contacts 89 and 90 of switch K are connected by means of a conductor 111 to the conductor 105 at connection 112.

The arm 62 of the switch C is connected by means of a conductor 113 with the intermediate contact point M of the pyrometer S. The contact arm 65 of the switch C is connected by means of a conductor 114 with the winding W2 of the motor field, the same being the low side winding of the motor.

The arm 45 of the low side limit switch E is connected by means of a conductor 115 to point L of the pyrometer S while the contact arm 49 of said switch E is connected by means of a conductor 116 to conductor 114 at connection 117.

The arm 45 of slow speed switch G is connected by means of a conductor 118 with the resistance R, while the other arm 49 of the switch G is connected by means of a conductor 119 to one of the brushes 120 of the motor O.

The other brush 121 leads to a connection 122 whence a branch 123 is connected to winding W2 and another branch 124 is connected to winding W1. A conductor 125 leads from the connection 122 to an arm 126 which is movable along the resistance R for varying the same and cutting resistance in or out of the motor O.

The various conductors are connected to the contact members of the several switches by soldering or welding or in any other suitable manner.

The axially movable rod 3 may be connected in any suitable manner to mechanism to be controlled by the regulator or controller of this invention. Such connection may consist of a valve or similar device for supplying fuel or fluid to an apparatus which supply is controlled by the temperature within the apparatus, in which event a pyrometer S would be employed. However, the rod 3 may be connected to any suitable mechanism and the pyrometer S might be replaced by a thermometer, a push button control or some other similar mechanism.

The switch box 26 is secured to the casing A by means of lugs 127 and 128 through which screws 129 pass for fastening the parts together. A cover plate 130 is removably secured to the switch box 26 by means of screws or similar fastening means 131.

Contact between contact point 67 of switch C and the contact point 89 of the rocker arm K is designated herein as contact P, while the other rocker arm contact between the contact point 76 of switch D and the contact point 90 of the rocker arm is designated Q.

The various parts shown in the accompanying drawings disclose the switches and the sliding plates 32 and 34 in mid position, that is, midway between the stop pins 37 and 38.

The operation of the controller is as follows:

The stroke of the plate 32 from mid position against the left hand stop pin 37 or from mid position to the stop pin 38 is termed the holding circuit stroke or initial stroke. The movement of the plate 34 in either left or right direction after the plate 32 has been stopped by engagement with either of the pins 37 or 38 is termed herein the secondary or supplemental stroke.

Assume that the parts are in mid position, that is with the parts as shown in the drawings, in which event the condition of the low side switches is as follows: A closed, C open, P open, E closed, G open and the switches on the high side are as follows: B closed, D open, Q open, F closed and G open.

Suppose that the contact H of the pyrometer S or any similar structure there employed is closed, then current will flow from line $L^1$ through conductor 102, contact point H, high side limit switch F, connection 109, conductor 107, winding $W^1$ of the motor, thence to line $L^2$, operating the motor in a direction to move the rod 3 and its associated plates to the left. The moment the rod 3 slides to the left, plates 32 and 34 will move with it in this direction. Follower 55 of switch C will then ride up on the higher cam 69 and the rocker arm K will be rocked to the right because of rolling engagement between it and the cam 69. Follower 79 of switch D will then ride up on to the lower cam plate 77 and because of the fact the rocker arm K is rocked to the right will close the switch Q that is to establish a circuit between the contact points 76 and 90, thereupon establishing a holding circuit for the motor for continuing operation of the motor in this direction.

The holding circuit established by closing the switch Q is as follows:

Line $L^1$, conductor 103, through switch A, switch B, conductor 105 to rocker arm K through switch Q to arm 74 of switch D, contact point 72, thence through conductor 107 to winding W¹ of the motor. The motor 2 continues to operate moving the rod 3 to the left until the plate 32 strikes the stop pin 37, whereupon movement of the plate 32 to the left ceases.

The cam plates are so arranged that when the plate 32 strikes the left hand pin 37, the high side holding switch B opens because of the fact that the swinging cam follower 61 thereof drops off the inclined end 60 of the cam 59 with snap action. The snap action results from the fact that the follower 61 is pivoted and as soon as the bottom thereof engages the inclined end 60 of the cam it will pivot and allow quick opening of the switch. The high side cam 85 of the slow speed switch G then engages the follower 55 of said switch and closes the contact to the switch G, cutting in resistance to the motor so that the speed of the same is reduced. All of the cam plates carried by the sliding plate 32 stop when said plate stops against the pin 37 and remain in this position as long as movement of the rod 3 to the left continues. The condition of the various switches with the plate 32 against the left hand stop pin 37 is as follows: Low side switch A closed, switch P open, switch E closed, low side of G open and switch C closed.

The high side switches are as follows: B open, D open, Q closed, F closed and G closed.

The pyrometer S or equivalent structure may have the contactor H intermittently closing, which intermittent closing of the contactor H causes intermittent current flow to the motor through the winding W¹, thus rotating the motor incrementally so as to inch the rod 3 to the left. The only circuit now which can be closed by the intermittent closing of the contactor H is the circuit first mentioned, namely, the one from line L¹ to conductor 102, contactor H, high side limit switch F, conductor 107 and winding W¹ of the motor. The slow speed switch G is closed, thus throwing in resistance so that the speed of the motor is reduced, hence momentary closing of the circuit to the winding W¹ rotates the motor but a slight amount with resultant inching of the rod 3 to the left.

The successive incremental movements of the rod to the left carries with it the plate 34 and when this plate 34 has moved to its extreme left position, then the high side limit switch F is opened, breaking the circuit between the contactor H of the pyrometer and the motor field W¹, whereupon no further actuation of the motor in this direction is possible.

The circuit from the mid contactor point M of the pyrometer S is established through either the contacts P or Q controlled by the rocker arm, hence both of these cannot be closed at the same time thus preventing current being supplied to the motor in a direction to reverse it when operating in one direction, should perchance the intermediate contact M of the pyrometer close.

Any instrumentality to which actuating rod 3 is connected will be actuated in accordance with the axial movement of the rod in the manner described.

Assume that the parts are at the left end of travel and the contactor M of the pyrometer S is closed.

The condition of the switches is as follows: Low side A closed, P open, C closed, E closed, G open; high side B open, D open, Q closed. F open and G closed. When the intermediate contactor M of the pyrometer S is closed therefore, current will flow from line L¹ through conductor 102, intermediate contactor point M, conductor 113, switch C, conductor 114 to the winding W2 of the motor, thus operating the motor in reverse direction, thereby moving the rod 3 to the right. As soon as the rod 3 starts its movement to the right, the slow speed contact of the switch G opens because of the fact that the follower 55a thereof is freed from the high side cam 85. The high side limit switch F is closed as the cam 81 thereof moves the arm 49 into the position shown in Figure 14. The rocker arm K is then rocked to the position shown in full lines in Figure 11 and in dotted lines in Figure 12, closing switch P. At the same time circuit holding switch B on the high side is closed, thus closing a holding circuit through the switch B and the winding W2 of the motor, which circuit is as follows: Line L¹, conductor 103, low side holding circuit switch A, high side holding switch B, conductor 105 to connection 112, thence by conductor 111 to contact point 89 on rocker arm K, thence through conductor 114 to the winding W2 of the motor. The motor will continue to run in a direction to move the rod 3 and its associated parts to the right. The cams on the plates 32 and 34 consequently move to the right until the center control circuit contact P is opened by the follower 55 falling into the gap between the cams 69 and 68, thus breaking the circuit to the motor from the mid contact point M of the pyrometer S. Simultaneously the follower 79 of the switch D falls into the gap between the cam plates 78 and 77 thereof, but this action does not affect any circuit as there was none established. The rod thereupon takes a stroke to the right utilizing the holding circuit to assure continuance of the operation of the motor for effecting such stroke until the rocker arm control is opened. Successive closures of the intermediate contactor M of the pyrometer S will have no effect for energizing the motor as the circuit to the motor from this contactor is open.

Should, however, the control contactor L of the pyrometer S be closed, then the motor would operate in a manner to move the rod to the right instead of to the left as first described, with the opening and closing of the various switches in reverse order.

Should, however, contact be established between the contactor H of the pyrometer S, then movement of the rod would be to the left until the holding circuit opens as above described, but no further as the high side limit switch F would open at the same time the holding circuit opens, that is at the same time the plate 32 strikes the left hand stop pin 37 because, by the previous operation, the plate 34 had lined up with the plate 32 so that the high side limit switch F opens with the opening of the holding circuit. This line-up is changed only when the control contact L closes to cause the rod to travel to the right throughout the holding circuit stroke and then subsequently operates a number of times for incremental travel of the rod to the right to move the plate 34 out of alinement with the plate 32 as heretofore described.

Assuming that the various parts of the regulator are in mid-position, that is, the position shown in the figures of the drawings, and the contactor L of the pyrometer S, or similar structure, is closed, then current will flow from line L1 through contactor L, conductor 115 through low side limit switch E, conductor 114 to winding W2 of the motor, rotating the same in a direction to move the rod 3 to the right. The moment the rod 3 moves to the right, the plates 32 and 34 move with it in the same direction. The follower 79 of switch D will then ride up on the higher cam 78 closing circuit between the contact points 72 and 75 of this switch. The rocker arm K will be in the position shown in full line in Figure 11 and in dotted lines in Figure 12. At the same time the follower 55 of the switch C will ride up on the lower cam 68 closing circuit between the contact points 67 of the switch C and 89 of the rocker arm K, thus closing switch P which established a holding circuit for the motor for continuing operation of the motor in a direction to move the rod to the right.

The holding circuit established by closing the switch P is as follows:

Line L1 through conductor 103, switch A, switch B, conductor 105, rocker arm K, switch P to arm 65 of switch C, thence by conductor 114 to winding W2 of the motor. The motor continues to operate in a direction to move the rod 3 to the right until the plate 32 strikes the stop pin 38 whereupon movement of the plate to the right ceases.

All of the cams carried by the sliding plate 32 stop when said plate strikes the pin 38 and remain in this position as long as movement of the rod to the right continues. The condition of the various switches with the plate 32 against the right hand stop pins 38 is as follows:

Low side switch A opened, switch C opened, switch P closed, switch E opened and the low side of the switch G closed.

The high side switches at this point are as follows:

B closed, D closed, Q opened, and F closed with the high side of the switch G opened.

The pyrometer S or equivalent structure may have the contactor L intermittently closing, which intermittent closing of the contactor L causes intermittent flow of current to the motor through the winding $W^2$, thus rotating the motor incrementally so as to inch the rod 3 to the right. The only circuit which now can be closed by the intermittent closing of the contactor L is the circuit above mentioned, the one from line L1 conductor 102, contactor L, conductor 115 through low side limit switch E, thence by conductor 114 to winding W2 of the motor. The slow speed switch G is closed on the low side, thus putting in resistance in the motor circuit reducing the speed of the same. Successive incremental movement of the rod 3 to the right carries with it the plate 34 and when this plate has moved to its extreme right position, then the low side limit switch E opens, breaking the circuit between the contactor L of the pyrometer or equivalent structure and the motor field W2, whereupon no further actuation of the motor in this direction is possible.

Assume that the parts are at the right end of travel, and the contactor M of the pyrometer S or equivalent structure is closed.

The condition of switches in this position is as follows:

Low side limit switch A is opened, switch C is opened, switch P is closed, low side limit switch E is opened, and low side of switch G is closed.

The high side switches are as follows:

B is closed, D is closed, Q is opened, and F is closed.

Contactor M of the pyrometer is intermittently closed, whereupon current will flow from line L1, conductor 102, contactor M, conductor 113, switch D, conductor 107 to the winding W1 of the motor reversing the operation of the motor to move the rod 3 to the left. As soon as the rod starts its movement to the left, the slow speed contact of the switch G opens because of the fact that the follower thereof 55a is freed from the low side cam 84. The low side limit switch E is closed as the cam 80 therefor moves the arm 49 into position shown in Figure 13. The rocker arm K is then rocked to the right closing switch Q and opening switch P.

The circuit holding switch A on the low side is closed at the same time, thus closing a holding circuit through the switch A and the winding W1 of the motor, which circuit is as follows:

Line $L^1$, conductor 103, switch A, switch B, switch Q, conductor 107 to winding $W^1$. The motor will therefore continue to run in a direction to move the rod 3 and its associated parts to the right. The cams on the plates 32 and 34 consequently are moved to the left.

Switch Q is opened by the follower 55 of switch D, falling into the gap between the cams 68 and 69, thus breaking the holding circuit to the motor from the main contact point M of the pyrometer S.

The illustrated form of the invention has been shown and described in connection with an axially movable rod cooperating with sliding cam plate bases carrying groups of cams for selectively actuating certain switches.

It is, of course, within the scope of this invention to embody the same in various and different arrangements of parts, such, for instance, as one wherein the rod, instead of being axially movable, might be rotatable or oscillatable, and also it is within the contemplation of this invention to substitute for the sliding cam plates rotating members, having the cams adjustably arranged on the same.

The invention has been described herein with respect to one form thereof, and also somewhat in detail; however, the invention is not to be limited thereby, as it is understood that changes may be made in the arrangement and proportion of parts and that equivalents may be substituted without departing from the spirit and scope of the invention.

The invention is claimed as follows:

1. In a control system including a reversing motor, an actuating rod movable by said motor, two sliding plates movable with said rod, said plates being relatively movable with respect to each other and also with respect to said rod, switches supported adjacent said plates, means carried by said plate for actuating said switches, means for limiting the travel of one of said plates, and means actuated by said plates in one direction of movement for preventing energization of the motor in the reverse direction while said motor is operating in one direction.

2. In a control system including a reversing motor, an actuating rod movable by said motor, relatively movable cam members movable with and with respect to said rod, motor control switches actuated by the movement of said cam members, limit switches actuated by one of said members, and means for adjusting the length of stroke of said rod by said motor while maintaining a holding circuit to said motor and operating it in one direction, said means being adjustable for varying the length of stroke of the rod while the holding circuit is established without affecting the length of the total possible stroke of the rod.

3. In a control system including a reversing motor, an actuating rod axially movable by said motor, switches for controlling the operation of said motor, relatively slidable cam bases for actuating said switches, cams adjustably carried by said bases, certain of said switches constituting limit switches, the cams for said limit switches being adjustable for varying the effective length of the stroke of the rod while a circuit to said motor is closed for operation of the same in one direction whereby said rod may be moved in one direction a distance controlled by the adjusted position of the limit switch in that direction, and other switches effective to return said parts to initial position after establishing reverse rotation of the motor.

4. In combination, an electric motor, switch means connected to initially close circuit means to energize said motor to cause rotation thereof, other switch means operated by rotation of said motor to energize said circuit means for a predetermined period of rotation of said motor, and means including other switch means operated by movement of said second named switch means limiting rotation of said motor to incremental rotation thereof upon subsequent closing of said first named switch means.

5. In combination, an electric motor, a plurality of switches connected adapted to intermittently close circuit means to initially energize said motor to cause rotation thereof, other switch means operated by rotation of said motor to selectively affect the control of the circuits connected to said first switch means and to selectively energize said motor for a predetermined period of rotation, and means including other switch means operated by movement of said second named switch means limiting rotation of said motor to incremental rotation thereof upon subsequent closing of certain of said first named switch means.

6. In combination, a movable member, electric motor means connected to said member to cause movement thereof, switch means to intermittently close circuit means to initially energize said motor means, other switch means operable by movement of said motor means to selectively affect circuits connected to said first named switch means and to selectively energize said motor means for a predetermined period, and means including other switch means operated by movement of said second named switch means connected in circuit with said motor means to limit movement of said axially movable member to incremental movement thereof upon subsequent closing of said first named switch means.

7. In combination, a movable member, electric motor means connected to said member to cause movement thereof, a plurality of switches connected to said motor means to intermittently close circuits initially energizing said motor means for initial movement of said movable member, other switch means operable by movement of said movable member to selectively energize said motor means for a predetermined movement of said movable member, and resistance and switch means insertible in circuit with said motor means by a predetermined movement of said movable member to limit movement of said member to incremental movement thereof upon subsequent closing of certain of said first named switches.

In testimony whereof I have hereunto subscribed my name at Chicago, Cook County, Illinois.

HAROLD C. BECK.